United States Patent [19]

Hochheiser

[11] 4,260,876
[45] Apr. 7, 1981

[54] DEW POINT DIFFERENTIAL POWER CONTROLLER

[75] Inventor: Jerome S. Hochheiser, Northridge, Calif.

[73] Assignee: Anthony's Manufacturing Company, Inc., San Fernando, Calif.

[21] Appl. No.: 968,023

[22] Filed: Dec. 11, 1978

[51] Int. Cl.³ .......................... H05B 1/00; H05B 1/02
[52] U.S. Cl. ................................. 219/497; 219/509; 219/218; 219/522; 219/203; 307/117
[58] Field of Search .............. 219/218, 494, 202, 497, 219/203, 499, 509, 501, 522, 492; 340/234, 235; 307/117

[56] References Cited

U.S. PATENT DOCUMENTS

| | | | |
|---|---|---|---|
| 3,519,917 | 7/1970 | Martin | 219/497 |
| 3,702,921 | 11/1972 | Thelen | 219/497 |
| 3,821,516 | 6/1974 | Hayes et al. | 219/497 |
| 3,902,040 | 8/1975 | Ikeda et al. | 219/501 |
| 3,909,675 | 9/1975 | Hirsbrunner et al. | 219/501 |
| 3,924,102 | 12/1975 | Hanekom | 219/497 |
| 4,029,937 | 6/1977 | Russell | 219/497 |
| 4,127,765 | 11/1978 | Heaney | 219/218 |

Primary Examiner—Arthur T. Grimley
Assistant Examiner—Mark H. Paschall
Attorney, Agent, or Firm—Morganstern, Mann & Smith

[57] ABSTRACT

A control circuit for proportionally controlling the application of available ac current to thin film heaters and other heating apparatus for transparent windows and other selected surfaces of refrigerated cabinets prevents condensation of moisture thereon. A transducing sensor in contact with the ambient air and thermally coupled to the refrigerated cabinet surfaces provides control signals to an ac heating current control circuit in relation to the difference between cabinet surface temperature and the dew point temperature of the ambient air. As the cabinet surface temperature drops closer to dew point the application of electric power to the transparent window and other surface heating apparatus is proportionally increased by the control circuit by applying heater current during correspondingly increased "on" periods for passage of the available ac heater current. "On" periods of the heater current are initiated during times in a cycle when the ac is at or near its null. At the two extremes of the operating range of the control circuit, heater current may be applied full "on" and full "off" respectively.

14 Claims, 4 Drawing Figures

DEW POINT DIFFERENTIAL POWER CONTROLLER

BACKGROUND OF THE INVENTION

1. Field of the Invention

This invention relates to heater control means for refrigerated display cabinet frost control arrangements, and more particularly to heater controls directly responsive to ambient air dew point.

2. Description of the Prior Art

In stores which sell refrigerated products, such as, for example, foods to customers directly from refrigerated cabinets, the problem of displaying the refrigerated items in a continuously visible manner has been known. It is often desired to provide the items directly visible to the customer through a transparent door or window which can be opened by the customer for selecting the foods. When the substantially cooler surface of the interior face of the door suddenly comes into contact with the relatively warmer ambient air, frosting and condensation often develop on what is hoped to be the transparent door. This result follows from the fact that the temperature of the interior-facing side of the transparent door is less than the dew point of the ambient air. This problem is directly addressed, and its background discussed in greater detail, in U.S. Pat. No. 3,859,502, granted Jan. 7, 1975 to James J. Heaney.

It has long been known to coat electrically conductive material in a thin film on an optically transparent glass surface of a refrigerated cabinet door. The film is thin enough such that the glass with the film coating continues to be optically transparent. The application of electrical potential causes the film to become an electrical resistance heater, heating the transparent glass.

The usual object of heating the glass is to maintain the glass temperature above the dew point temperature of the warmer ambient air outside the cabinet. With the glass temperature maintained above the dew point, condensation and frost coating which would tend to obstruct view through the glass door is prevented.

It has also been known to provide heating wires positioned inside the frames of such refrigerated cabinet doors and possibly within mullions and other portions of the refrigerated cabinet structure for heating the frame. The heating wire would be connected to available ac electric energy to comprise an electrical resistance heater heating the adjacent frame structure. The heating wire would be electrically insulated from the frame to prevent electric shock. As with the heating of glass with the frame maintained above the dew point, condensation on the outside surfaces of the frame which might present an annoyance is prevented.

If the dew point temperature of the ambient air is high, heating the glass coated by the electrically resistive thin film and heater wires will require quite substantial amounts of electrical energy. It is often desired to reduce the amount of electrical energy applied in such applications, while retaining the benefit of a frost and condensation free, transparent refrigerated cabinet door and structure.

Suggestions have been made to selectively control power to such thin film resistance heaters and heater wires, in order to conserve electric power energy. Such a system appears to involve a sensitive device placed in abutment with the frame or mullion, or even perhaps with the transparent window itself. Prior to water condensing on the window, moisture should develop on the sensor which then, so far as is known, switches electrical energy to the heater.

Such suggestions appear to be steps in the sought or desired direction. Such systems, however, continue to apply electric heating energy at a constant rate resulting in substantial overshoot and undershoots, well known characteristics of on-off control systems. During periods of undershoot, water condensation on the window is distinctly possible. In periods of overshoot excessive electric energy is used, which may cause heating problems if not for the refrigerated cabinet interior, then for the customer shopping area outside the cabinet.

SUMMARY OF THE INVENTION

The present invention provides electric resistance heater control arrangements for selectively controlling the application of electrical potential to thin film heaters and heater wires on refrigerated cabinet windows, doors and frames. The system sensor responds to the differential between the ambient air dew point temperature and the surface temperature of the refrigerated cabinet section in which the sensor is mounted and actuates the system to proportionally apply increasingly greater amounts of heating energy to thin film heaters and heater wires as the cabinet surface temperature approaches the dew point where condensation will likely occur. The system will continue to apply electric energy to thin film heaters and heater wires in proportionally lesser amounts as the temperature of the windows, doors and frames progressively elevates above the dew point of the ambient air.

More particularly, in accordance with one aspect of the invention, a refrigerated display cabinet has a front surface including mullions and pivotally hinged transparent doors. The doors are made transparent by glass panes situated within door frames. At least one pane on each door has one face coated with electric resistance heater material thin enough to maintain the transparency of the glass. Mullions adjacent the door are equipped with heating means, usually in the form of heater wires positioned inside the front surfaces of the mullions.

A dew point sensing device is fastened to a mullion, the device having a dew point sensing element thermally coupled to the mullion surface but exposed to adjacent ambient air outside the cabinet. The dew point sensing device is mounted on the surface of an electrically insulative board, which in turn is mounted on the mullion surface, the insulative mounting board providing both electrical insulation and substantial thermal coupling between the sensing element and the mullion. The sensing element provides a variable impedance to passage of applied alternating current (ac) therethrough, the variable impedance being related to the difference between mullion surface temperature and the dew point of the ambient air. The impedance is connected in an ac powered sensing circuit having both ac and direct current (dc) portions, the dc circuit portion being dynamically isolated from the commonly available ac voltage supply and controlling the on-off times of a triac switch which applies the available electric current to the thin film coating and heater wire heating means.

Signals responsive to the dew point sensing means are formed in the corresponding dc coupled portion of the sensing circuit fo fire the triac switch. Ac-to-dc rectifying diodes and triodes are placed in the circuit to isolate the dc portion of the control circuit from the ac sensor and energy supply. A triode whose control node is responsive to the dew point sensing device, presents a varying dc voltage to an input of a sense amplifier which compares the corresponding variable dc voltage with a pre-set reference voltage.

The sense or comparison amplifier is designed to operate as an astable multivibrator to provide proportional control to the triac switching. When the difference between the cabinet surface temperature and the dew point falls to within a selected range as defined by the circuit design, the astable multivibrator produces a signal which alternatively cuts the traic "on" and "off". The triac "on" time progressively becomes longer relative to its "off" time as the mullion surface temperature drops toward the dew point temperature of the ambient air. The sense amplifier's output is directed to the control node of the triac through a series of tandem connected amplifier gates resulting in a firing of the triac in those proportional times that the output of the sense amplifier is inhibited.

Additional rectifying diodes are provided between the dc circuit and the ac supply to control the output signal of the control circuit to produce a signal only when the ac is very close to null, thus reducing the possibility of causing radio frequency interference. In the embodiment described, this output control has superposed on it the sense amplifier output to control the tandem connected gate controlling the triac firing. The proportional output of the sense amplifier thus results in a triac firing signal that initiates firing at limited periods in the ac cycle and to periods of time that become proportionallyless as the dew point sensing device perceives a surface temperature rising further above the dew point.

Other novel features which are believed to be characteristic of the invention, together with further objects and advantages thereof, will be better understood from the following description considered in connection with the accompanying drawings in which a preferred embodiment of the invention is illustrated by way of example. It is to be understood, however, that the drawings are for the purpose of illustration and description, and are not intended as a definition of the limits of the invention.

DESCRIPTION OF THE PREFERRED EMBODIMENT

Figure 1:
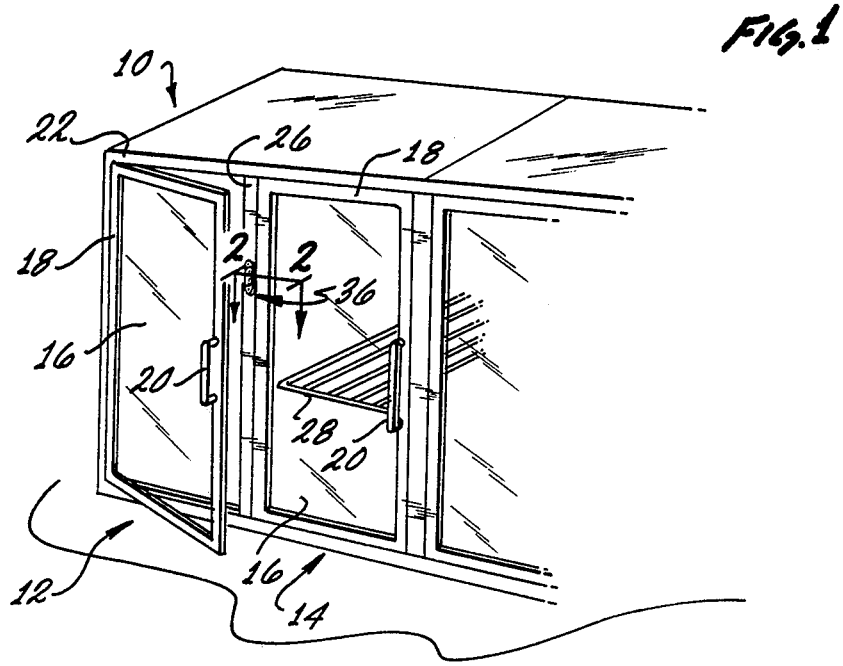
FIG. 1 is a perspective view showing portions of the refrigerated cabinet having a transparent door in accordance with the preferred embodiment of the invention.

In FIG. 1, a refrigerated cabinet 10 is shown having doors 12, 14 pivotally connected to its front. Each door has a pair of parallel glass panes 16 held within a door frame 18. A handle 20 is positioned on the frame of each door so that a customer may open the door along the pivot axes 22.

The doors 12, 14 are separated by a mullion 26. Interior shelves 28 rest on the mullion 26 for supporting refrigerated foods. A sensor mounting unit 36 is fastened to the mullion 26.

The interior pane is placed parallel to the outside pane 16. The outer pane 16 of the door 14 has an electrically conductive metallic coating coated on its inside facing surface. The coating comprises any of several well-known thin film coating materials having conductivity when electrical potential is applied thereacross. Aluminum is one such material that has been used with satisfaction in the past. The film is sufficiently thin so that the transparency of the parallel glass panes is not impaired.

Figure 2:
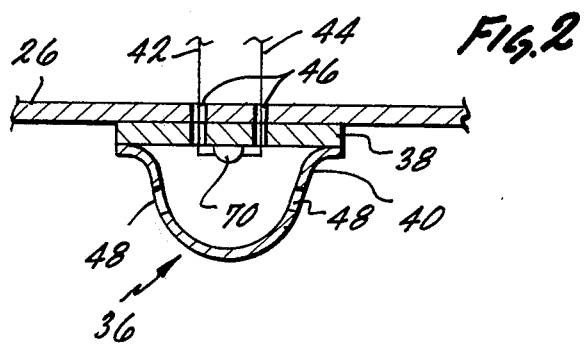
FIG. 2 is a horizontal cutaway view of a mullion of a refrigerated cabinet showing in cross-section a sensor of the preferred embodiment of the invention.

FIG. 2, a cross-sectional cutaway seen along lines 2—2 of FIG. 1, shows the mullion 26 and the sensor unit 36 in horizontal cross-section. The sensor unit 36 is mounted to the mullion 26 on an electrically insulative printed circuit board 38. The sensor unit 36 comprises an outside shield 40 having vent holes 48 through which ambient air may flow to come in contact with the sensing element 70.

Sensing element 70 is mounted to the circuit board 38 having leads 42, 44 connected on either side thereof. The leads are preferably insulated for those portions extending beyond the circuit board 38 and the mullion 26. Holes 46 are formed in the mullions as well as in the circuit board for passing the leads 42, 44 therethrough.

Figure 3:
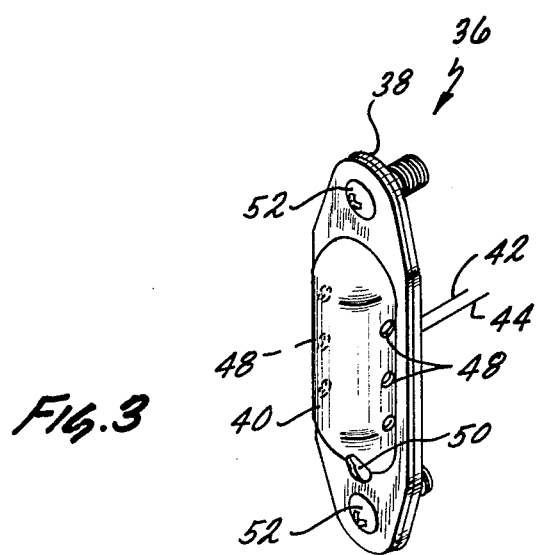
FIG. 3 is a perspective view of a sensor in accordance with the preferred embodiment of the invention.

FIG. 3 shows the sensor unit 36 in perspective, having the cover 40 and vent holes 48 therein, shown assembled to the circuit board 38 by threaded fasteners 52. A drain hole 50 is provided at the lowermost end of the shield 40 to further vent the interior of the sensor unit assembly 36, and to provide condensation escape should any water condense within the assembly. Leads 42 and 44 extend to the rear of the circuit board 38. The sensor unit assembly 36, therefore, is adapted to be mounted on a refrigerated cabinet surface, such as the mullion 26 by the threaded fasteners 52, which also hold the cover 40 to the circuit board 38. The surface should be prepared having suitable holes 46 for passing the leads 42, 44 therethrough.

The leads 42, 44 connect the sensing element 70 to a variable resistance 72 connected in series circuit across the ac voltage and current supply, explained in more detail below in connection with FIG. 4. The circuit board 38 is electrically insulating to insulate the sensing element 70 from the mullion. The circuit board 38, however, should be sufficiently thin to provide effective thermal coupling between the sensing element 70 and the mullion 26 so that the sensing element 70 can accurately perceive the temperature of the mullion 26.

Figure 4:
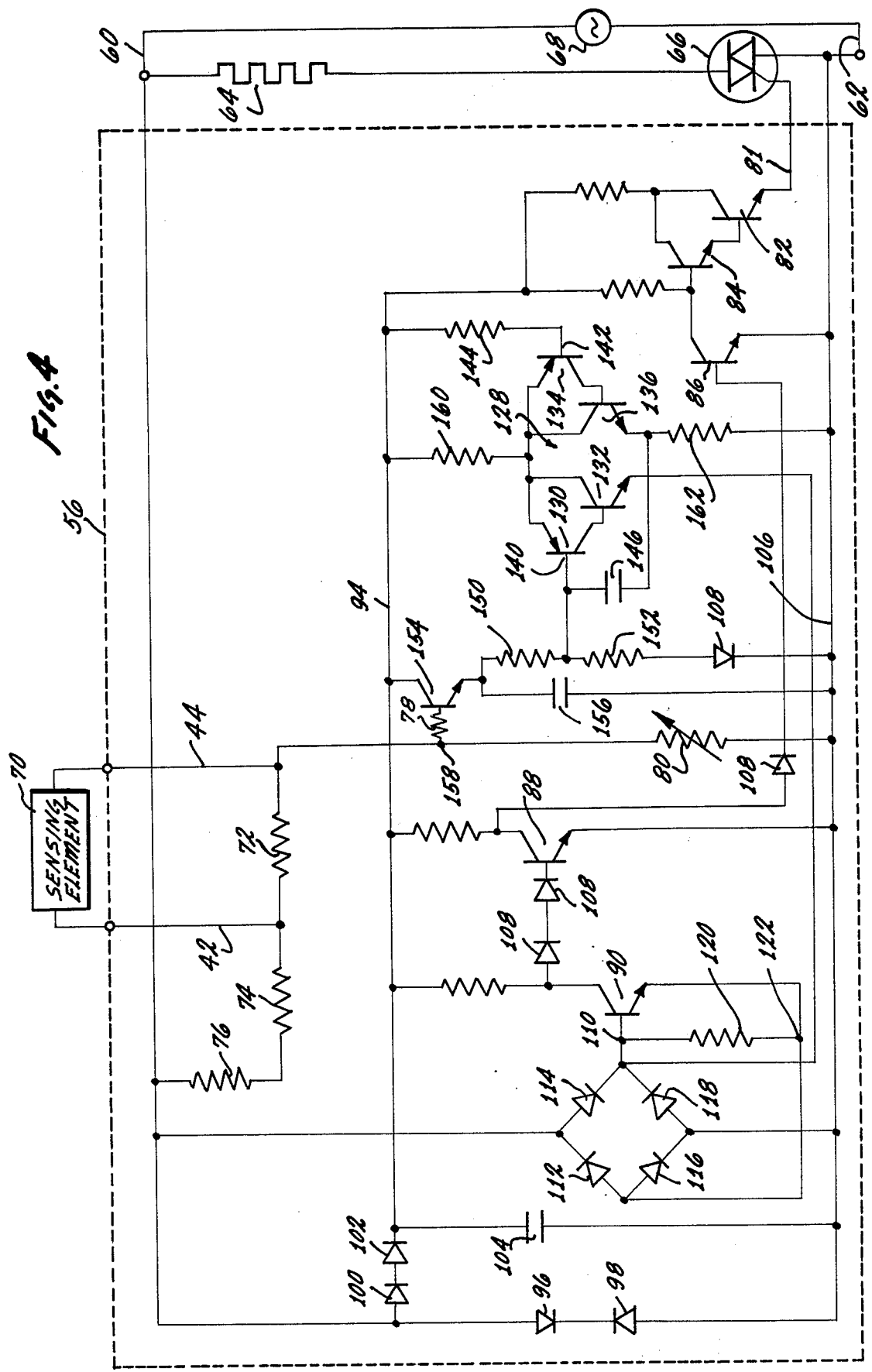
FIG. 4 is an electrical schematic diagram showing the control circuit of the preferred embodiment.

The detail of the switching control circuitry is seen in FIG. 4 where a control circuit 56 is shown within the boundaries of the broken lines. The lead 60, connected in series with the resistance heater 64 and in series with a triac switch 66, is connected to a source 68 of voltage having alternating current. Lead 62 completes the ac supply circuit.

The sensing element 70 acts as a variable impedance which is connected across resistor 72. The magnitude of the variable impedance of element 70 decreases as the dew point temperature of the ambient air in contact with the sensing element 70 becomes closer to the temperature of the mullion 26, to which the sensing element 70 is thermally coupled by the board 38. The variable impedance of 70, therefore, can be understood to vary in accordance with the difference between the temperature of the cabinet surface and the dew point temperature of the ambient air.

The variable impedance sensing element 70 is connected in series electric circuit with protecting resistors 74, and 76 to the ac supply lead 60. Adjustable resistor 80 is serially connected between the resistor 72 and ground 106 to complete the ac circuit (through lead 62).

The output of the control circuit 56 is seen at node 81 as a series of pulses which form the triggering pulses for the triac gate 66. For purposes of conveniently explaining the operation of the switching control circuitry, it will be assumed in the following explanation that a controlled pulse sufficient to fire the triac 66 exists at the node 81. This pulse will normally exist when circuit inputs operate to inhibit the pulse forming at gate 90, as will be described.

Transistor amplifiers 82, 84, 86, 88 and 90 are connected in tandem, each receiving collector current from the high or positive voltage on node 94. Node 94 comprises the positive side of a dc circuit established by the limiter voltage clipping diodes 96, 98 and rectifying diodes 100, 102. A voltage regulating capacitance 104 helps to regulate a constant dc potential difference of approximately six volts from the node 94 to the common (ground) 106 connected to the lead 62. Protection diodes 108 are placed between the tandem connected amplifiers 90 and 88, and between amplifiers 86 and 88 to protect the transistors.

The emitter of gate 86 is connected to the common 106 so that when gate 86 is conducting, a zero control voltage is applied to gate 84 to cut it "off". When gate 86 is not conducting, gates 84 and 82 will conduct, to direct a dc current from the emmiter of gate 82 in node 81 to the triac 66. Gate 86 is not conducting when gate 88, whose collector is the control node for gate 86, is conducting. Gate 88 will be conducting only at those times when gate 90, whose collector is the control node for gate 88, is non-conducting. The first gate 90 thereby controls the firing of the triac 66 through the tandem connected transistors 88, 86, 84 and 82. A signal emerges in the collector output of gate 82 only in those instances where gate 90 is not conducting.

Gate 90 has its control node 110 at a voltage defined by the ac voltage from the available supply line 60, 62 establishing current in the diodes 112, 114, 116, and 118. Diodes 112, 114, 116 and 118 are connected between leads 60 and 62 for full wave rectifying the current in the ac line to a pulsating direct current through the node 110 and the control bias resistor 120. The direction of the diodes establishes a pulsating direct current from a positive or higher potential in node 110 to the common or collector node 122, with a corresponding pulsating positive control or bias voltage being established at node 110 by current through the resistor 120.

Gate 90, therefore, will be nonconducting at those instances where the pulsating positive voltage at node 110 is essentially zero, or so close to zero as to establish a voltage at node 110 which is below the threshhold voltage necessary for establishing a current conducting state in the transistor 90. As explained hereinabove, a small firing pulse for the traic 66 is established corresponding to the small time period in which transistor 90 is nonconducting. At 60 Hz, the time width of the conducting signal from gate 82 is typically 100 microseconds. As the frequency of the ac supply is increased, the width of the firing signal is decreased.

The conducting state of gate 90 is also controlled by current from the sense amplifier 128 comprised of transistors 130, 132, 134 and 136. Emitter-collector transistor 130 is paired with collector-emitter transistor 132 to form a high-beta composite p-n-p transistor in which the emitter of transistor 132 acts as a collector of the composite device. Transistors 134 and 136 are similarly paired. The current flow of the two "collectors" becomes a function of the difference in the input or control voltage of the base 140 of transistor 130 compared with the input or control voltage of the base 142 of transistor 134. The voltage at control base 142 is established by the high potential node 94 through resistance 144. The "collector" of the transistor pair 134 and 136 is capacitively coupled to the voltage input at base 140 through capacitor 146.

The voltage at input base 140 is taken between resistances 150 and 152 connected in series with each other and transistor 154 to complete the circuit from the high potential node 94 to common 106. Transistor 154 has its base controlled by the voltage in the voltage dividing network of the ac circuit between the impedance of sensing element 70 (in parallel with resistor 72) and the impedance of the resistance 80. Transistor 154, because of the rectifying action of the emitter-base junction and because of diode 108 in its resistive emitter circuit (resistors 150, 152 and diode 108) supplies rectified direct current in its resistive emitter circuit. Capacitor 156 provides a bypass path around the resistive emitter circuit for any residual ac current.

The current in transistor 154 is governed by the voltage at node 158 of the voltage dividing network, i.e. between the series connected impedance 80 and the parallel combination of 72 and 70. The variable impedance of sensing element 70 will vary the voltage at the control base 158. The current in the transistor 154, therefore, will vary in relationship with the variation of the voltage at node 158, which is in turn directly related to the variations in the ac impedance of dew point sensing element 70.

Sense amplifier 128 directs substantially all of the current from the high potential node 94 through resistance 160 to the emitters of transistor 136 and transistor 132. When the control voltage input 142 is lower than the control voltage input 140, substantially all of the current through resistor 160 is directed through transistor 136 to the common 106 through emitter impedance 162.

When the control voltage input 140 is lower than the control voltage input 142, substantially all of the current through resistor 160 is directed through transistor 132 to positively bias the control base node 110 for transistor 90, thus holding transistor 90 conductive, and thereby preventing switching "on" of triac 66 and thus preventing ac current flow through heater 64. [Whenever the voltage of base 140 is substantially less than the voltage at base 142, the transistor 90 is in a conducting stage (regardless of the time in the ac cycle), and transistor 82 is "off", maintaining the triac switch 66 in an "off" state.] Conversely, whenever the voltage at node 140 exceeds the voltage at control base 142, transistor 132 is rendered essentially nonconducting permitting the steady state or reference voltage at control node or base 110 of transistor 90 to fall near zero volts. Thereafter, each successive negative directed cusp of the full wave rectified ac (from diodes 112, 114, 116, 118) establishes a nonconducting state in transistor 90, in turn firing the triac 66 in synchronism with each cusp to complete the ac circuit through the heater 30.

The capacitive coupling between the "collector" of the transistor pair 134, 136 and the control base 140 of the transistor pair 130 and 132 cause the sense amplifier 128 to operate essentially as an astable or free-running multivibrator. When transistors 130 and 132 become conducting and transistors 134 and 136 become therefore non-conductive, the voltage fall at the emitter of 136 causes a negative going pulse to be coupled through capacitor 146 to base 140 to hold node 140 negative (relative to node 142) for a period of time which is determined by the RC time constant of the charging circuit of capacitor 146. This time period (which is the triac "off" period) is also responsive to the steady state bias voltage applied to node 140 (as tapped off divider circuit 150 and 152), the triac "off" time period being longer if the steady state bias voltage is initially low, and being shorter if the steady state bias voltage of node 140 is higher. This therefore is the manner in which the length of the "off" period of triac 66 is determined.

As indicated, the negative going voltage pulse which is coupled through capacitor 146 to base 140, decays exponentially as capacitor 146 charges to finally, after a period of time (determined as stated above) permit transistors 130 and 132 to become non-conductive, and permit transistors 134 and 136 to hog the current and become conductive. The resultant voltage rise at the emitter of transistor 136 causes a positive going voltage pulse to be coupled through capacitor 146 to base 140, which then holds base 140 positive (relative to 142) for a period of time (the triac "on" period) which is also controlled by the RC time constant of the capacitor 146 and by the steady state bias voltage of base 140. In this second period of the duty cycle of sense amplifier 128, a low steady state bias voltage at 140 causes the triac "on" period to be shorter while a higher steady state bias causes the triac "on" period to be longer.

Thus overall lowering the steady state bias voltage at node 140 has the effect of lengthening the triac "off" period and shortening the traic "on" period. Conversely raising the steady state bias voltage has the effect of shortening the traic "off" period and lengthening the triac "on" period.

It will be clear therefore that a decrease in the impedance of sensing element 70, which increases the voltage at 158 and hence at base 140, has the effect of lengthening the traic "on" period and decreasing the triac "off" period relative to each other. Conversely, an increase in the impedance of sensing element 70 has the effect of shortening the triac "on" period and decreasing the triac "off" period relative to each other.

It is possible that the steady state bias voltage at base 140 will become so low that even when capacitor 146 fully charges, the voltage at 140 will not rise to such a point as to exceed the voltage at base 142. At this stage, the transistor pair 134 and 136 will be continuously nonconducting, and there will be virtually no ac current through the heater 64. Conversely, if the steady state bias voltage at base 140 becomes substantially higher than the voltage at base 142 that the charging of capacitor 146 will not lower the voltage sufficiently at base 140 and the voltage at base 140 will remain above the voltage at 142, transistor 136 is on continually, and the ac circuit through heater 64 is on at all times.

In operation, the sensor mounting unit 36 is fastened to the surface of a refrigerated cabinet, such as at mullion 26 in close proximity and adjacent to the transparent plane 16. The circuit board 38 is fastened in thermal contact with the mullion 26 to provide a thermal path or coupling between the sensing element 70 in the refrigerated cabinet surface. Since the mullion 26 and windows 16 are adjacent each other and are heated under common control, the mullion temperature will be related to the window temperature, although of course it may have a temperature offset relative to the window temperature. Compensation for any such temperature offset can be provided by a compensating electrical off-set to the control circuit through adjustment of the adjustable resistor 80. If desired, a suitably modified sensing element can be placed directly on the window or other portions of the enclosing wall of the refrigerated display cabinet which are thermally closely related to the window surface.

Leads 42, 44 from opposite sides of the sensing element 70 are connected to the control circuit 56 across resistor 72. The control circuit 56 may be conveniently placed with other electronics in the refrigerated cabinet, such as in the cabinet recesses or compartments where wiring and circuitry for the lighting and refrigerating components are kept. The control circuit 56 receives ac energy from commonly available ac energy source 68 through leads 60, 62. An output 81 from gate 82 is connected directly to the control gate of traic 66. Triac 66 is connected in series circuit with the heating means 64 in the ac circuit. The heating means 64 may comprise the thin film electrically resistive coating on the transparent panes 16 and heating wires positioned in the frames of the windows and cabinet.

The parallel impedance of resistor 72 and sensing element 70 is determined by the dew point responsive impedance of the sensing element 70 whose impedance which is a function of the difference between the dew point of ambient air and the temperature of the mullion 26 to which it is thermally coupled to board 38. As the dew point of the ambient air becomes closer to the temperature of the mullion 26, the impedance of sensing element 70 becomes less, causing the current at node 158 to increase. Conversely, as the dew point of the ambient air varies away from the temperature of the mullion 26, the impedance of sensing element 70 increases, to decrease the current at node 158.

An increase in the current in node 158 is amplified by the triode 154, to result in an increase in current through the resistances 150, 152 of the voltage dividing circuit from the collector of triode 154 to ground 106. The increased current effectively raises the voltage level of control node 140 of the transistor pair 130, 132. Increase of the voltage at base 140 increases the proportional amount of time that current is conducted through the transistor pair 134, 136 in the on-off cycle of the astable multivibrator 128, resulting in an increase in the proportional amount of time that the triac 66 is fired to complete the ac heating circuit through heater 64. On the other hand, an increase in the difference between the dew point and the sense temperature of the mullion 26 results in a lower voltage at base 140 to increase the proportional amount of time of non-conductance in transistor 132 in the on-off cycle of the astable multivibrator 128, resulting in an increase in the proportional amount of time that the triac firing is inhibited.

Summarizing, a control circuit for controlling available, standard wall ac electric energy to a heater heating refrigerated cabinet transparent windows and frames is described. A sensing element or sensor means is coupled in the available ac supply and is responsive to the variations in the difference between the dew point in the ambient air immediately adjacent the outside panes and frames of refrigerated cabinets and the temperature of the panes and frames themselves. This sensor means presents a variable impedance to the ac current therethrough. A dc control circuit is established having as a source of its electrical energy the available ac source. The dc circuit includes an impedance (the impedance of transistor 154) in accordance with the variable impedance of the sensor.

A sense amplifier means is coupled within the dc circuit having two substantially mutually excluding outputs, one connected to a control gate which, through a series of tandem connected transistor gates, controls an intermittent firing signal to a triac. The triac when fired, closes the ac circuit through the heater means. The sense amplifier is constructed as an astable multivibrator to produce an intermittent controlling current and voltage for the first gate, the time of current application versus current removal being proportionally controlled by the variable dc impedance which is in turn controlled by the variable ac impedance of the sensor means. The circuit can be arbitrarily designed to set the limits where continuous application of current to the heater, or continuous open circuiting of the heater circuit occurs.

The dc circuit further contains rectifying or converting means coupled to the first or control gate for limiting the time that the triac is fired to substantially those times during which the ac energy is at or very close to zero (i.e., when the voltage curve is changing its sign). The dc circuit superimposes the two controls controlling the triac so that the firing signal is produced at those times when the ac voltage is at or close to zero, and a proportional triac "on" time is being provided by the sense amplifier astable multivibrator. The traic comprises a solid state switch means connected in series circuit with the heater and the ac energy supply which, responsive to the control signals coupled to it from the first gate, fires only at those time proportionally determined by the output of the control circuit.

Although a particular embodiment of the invention has been described and illustrated herein, it is recognized that modifications and equivalents may readily occur to those skilled in the art. Consequently, it is intended that the claims be interpreted to cover such modifications and equivalents, and that the invention be limited only thereby.

What is claimed is:

1. A control circuit for proportionally controlling and applying an ac current from an available ac electric current source to heater means for heating transparent windows adapted for use as openable walls of a refrigerated cabinet having a surface exposed to ambient air outside the cabinet, said control circuit comprising:
   (a) dew point sensing impedance means coupled to said available ac current source and thermally coupled to said cabinet surface and exposed to ambient air adjacent said surface, for providing a variable impedance to passage of ac current therethrough proportional to the difference between the temperature of said cabinet surface and the dew point temperature of said ambient air;
   (b) sensing circuit means powered by said source of ac current, said sensing circuit means being electrically coupled to said dew point sensing means and responsive thereto for producing an intermittent output pulse signal whose on-off duty cycle is within a predetermined range proportional to the impedance of said dew point sensing means, said output pulse signal being initiated only at those times when said ac current is at or close to zero, when the cabinet surface temperature is at or close to the dew point temperature of said ambient air; and
   (c) solid state switch means connected in series circuit with said heater means and said available source of ac current, and responsive to said output pulse signal of said sensing circuit means for completing a series circuit of ac current from said source through said heater means during times proportionally determined by said output pulse signal.

2. The control circuit of claim 1 wherein said sensing circuit means includes ac-dc converting means for producing a pulse dc, said sensing circuit means initiating output pulse signals only at times corresponding to the initiation of a pulse dc when said ac current is at or close to zero.

3. The control circuit of claim 1 wherein said sensing circuit means includes means responsive to a current passing through said variable impedance for producing a dc control voltage, said sensing circuit means being responsive to said dc control voltage for producing said output signal.

4. The control circuit of claim 3 wherein said solid state switch means comprises a triac whose conductance is responsive to said intermittent output pulse signal of said sensing circuit means.

5. The control circuit of claim 1 wherein said sensing circuit means comprises an astable multivibrator having at least one input whose voltage is coupled to said impedance proportional to the difference between the temperature of said cabinet surface and the dew point temperature of said ambient air, and wherein the intermittent output pulse signal on-off duty cycle is determined within said predetermined range by said proportional impedance determined input.

6. The control circuit of claim 5 wherein said solid state switch means is coupled to said sensing circuit means by a plurality of successive, tandem connected triodes, each triode having its control node connected to a node other than the control node of the preceeding triode, the first triode of said plurality having its control node coupled to and responsive to the intermittent output pulse signal of said sensing circuit means, for producing a control signal to said solid state switch means from the last of said plurality of successive triodes, to complete the series circuit through said solid state switch means only when said first triode in said plurality of tandem connected triodes, is not conducting.

7. The control circuit of claim 1 wherein said solid state switch means comprises a triac having its control node coupled to the output of said sensing circuit means whose output pulse signal has a progressively greater "on" time in its on-off duty cycle as the difference between the temperature of said cabinet surface and said dew point temperature becomes less.

8. The control circuit of claim 1 wherein said solid state switch means comprises a triac having its control node coupled to the output of said sensing circuit means whose output pulse signal has a progressively greater "on" time in its on-off duty cycle as the difference between the temperature of said cabinet surface and said dew point temperature becomes greater.

9. A refrigerated cabinet heating system control circuit for proportionally controlling and applying an ac current from an available ac electric current source to heater means for heating transparent windows adapted for use as openable walls of a refrigerated cabinet having a surface exposed to ambient air outside the cabinet, said control circuit comprising:

dew point sensing means coupled to said available ac current source and thermally coupled to said cabinet surface and receiving ambient air adjacent said surface, for producing an output signal proportional to the difference between the temperature of said cabinet surface and the dew point temperature of said ambient air;

sensing circuit means powered by said source of ac current, said sensing circuit means being electrically coupled to said dew point sensing means and responsive to said output signal for producing an intermittent output pulse signal whose on-off duty cycle is within a predetermined range proportional to the signal produced by said dew point sensing means; and solid state switch means connected in series circuit with said heater means and said available source of ac current, and responsive to said output pulse signal of said sensing circuit means for completing a series circuit of ac current from said source through said heater means during times proportionally determined by said output signal.

10. The refrigerated cabinet heating system control circuit of claim 9 wherein said dew point sensing means includes means for providing an impedance to passage of ac current therethrough, proportional to the difference between the temperature of said cabinet surface and the dew point temperature of said ambient air, and further includes means responsive to said impedance for producing said output signal as an ac output signal.

11. The refrigerated cabinet heating circuit of claim 9 wherein said sensing circuit means includes means for initiating said output pulse signal only at those times when said ac current is at or close to zero.

12. The refrigerated cabinet heating system control circuit of claim 10, said sensing circuit means includes ac-dc converting means for converting available ac current to pulsating dc current, said sensing circuit means being responsive to said pulsating dc current for initiating said intermittent output pulse signal only at times corresponding to the initiation of a pulsation thereof when said ac current is at or close to zero.

13. The refrigerated cabinet heating system control circuit of claim 10 wherein said sensing circuit means includes means responsive to said ac output signal for producing a dc control voltage, said sensing circuit means being responsive to said dc control voltage for producing said output pulse signal.

14. The refrigerated cabinet heating system control circuit of claim 9 wherein said sensing circuit means comprises an astable multivibrator having at least one input whose voltage is coupled to receive said output signal proportional to the difference between the temperature of said cabinet surface and the dew point temperature of said ambient air, and wherein the intermittent output pulse signal on-off duty cycle is determined within said predetermined range by said proportionally produced output signal.

* * * * *

UNITED STATES PATENT OFFICE
CERTIFICATE OF CORRECTION

Patent No. 4,260,876                Dated April 7, 1981

Inventor(s) JEROME S. HOCHHEISER

It is certified that error appears in the above-identified patent and that said Letters Patent are hereby corrected as shown below:

Abstract, line 3,           change "apparatus" to -- means -- ;

Abstract, lines 13-14,      change "apparatus" to -- means -- ;

Col. 2, line 67,            change "fo" to -- to -- ;

Col. 3, lines 32-33,        change "proportionallyless" to -- proportionally less -- ;

Col. 7, line 64,            change "plane" to -- panes -- ;

Col. 11, line 24 (Claim 9), after "output" insert -- pulse --.

Signed and Sealed this

Eighteenth Day of August 1981

[SEAL]

Attest:

GERALD J. MOSSINGHOFF

Attesting Officer        Commissioner of Patents and Trademarks